United States Patent
Osawa

(10) Patent No.: US 9,243,126 B2
(45) Date of Patent: Jan. 26, 2016

(54) ORGANOSILICONE EMULSION COMPOSITION

(71) Applicant: SHIN-ETSU CHEMICAL CO., LTD., Chiyoda-ku, Tokyo (JP)

(72) Inventor: Yoshihito Osawa, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/586,090

(22) Filed: Dec. 30, 2014

(65) Prior Publication Data

US 2015/0197625 A1 Jul. 16, 2015

(30) Foreign Application Priority Data

Jan. 16, 2014 (JP) ................. 2014-005690

(51) Int. Cl.
| | | |
|---|---|---|
| C08J 3/03 | (2006.01) | |
| C08K 5/5419 | (2006.01) | |
| C08K 5/06 | (2006.01) | |
| C08J 3/05 | (2006.01) | |
| C08G 65/336 | (2006.01) | |
| C09D 183/06 | (2006.01) | |
| D06M 15/647 | (2006.01) | |

(52) U.S. Cl.
CPC ............... *C08K 5/5419* (2013.01); *C08K 5/06* (2013.01); *C08G 65/336* (2013.01); *C08J 3/03* (2013.01); *C08J 3/05* (2013.01); *C09D 183/06* (2013.01); *D06M 15/647* (2013.01)

(58) Field of Classification Search
CPC ..................................... C08J 3/05; C08J 3/03
See application file for complete search history.

(56) References Cited

U.S. PATENT DOCUMENTS

| | | | |
|---|---|---|---|
| 4,814,376 A | | 3/1989 | Tanaka et al. |
| 5,684,112 A | * | 11/1997 | Berthiaume et al. ............ 528/29 |
| 6,294,159 B1 | * | 9/2001 | Reich et al. ................ 424/70.12 |
| 2011/0052521 A1 | * | 3/2011 | Tanaka et al. .............. 424/70.12 |

FOREIGN PATENT DOCUMENTS

| | | |
|---|---|---|
| JP | 63-125530 A | 5/1988 |
| JP | 5-32788 A | 2/1993 |
| JP | 7-70327 A | 3/1995 |

* cited by examiner

*Primary Examiner* — Margaret Moore
(74) *Attorney, Agent, or Firm* — Birch, Stewart, Kolasch & Birch, LLP

(57) ABSTRACT

An organosilicone emulsion composition comprising (A) 100 parts by weight of an organopolysiloxane having a viscosity of at least 500 Pa·s at 25° C., (B) 1-50 parts by weight of a polyether-containing organosiloxysilicate, (C) 1-50 parts by weight of a nonionic surfactant, and (D) 10-1,000 parts by weight of water is stable.

4 Claims, No Drawings

ORGANOSILICONE EMULSION COMPOSITION

CROSS-REFERENCE TO RELATED APPLICATION

This non-provisional application claims priority under 35 U.S.C. §119(a) on Patent Application No. 2014-005690 filed in Japan on Jan. 16, 2014, the entire contents of which are hereby incorporated by reference.

TECHNICAL FIELD

This invention relates to an organosilicone emulsion composition and more particularly, to a fully stable emulsion composition of a high-viscosity organopolysiloxane.

BACKGROUND ART

Organopolysiloxanes find use as textile treating agents, parting agents, water repellents, and cosmetics since substrates can be endowed with smoothness and water repellency by treating them with organopolysiloxanes. Among others, high-viscosity organopolysiloxanes are quite effective for imparting smoothness. Due to the recent enhanced concern about the environment, there are an increasing tendency to use aqueous treating agents and an increasing demand for stable emulsions of high-viscosity organopolysiloxanes. However, the high-viscosity organopolysiloxane has so high a viscosity that no mechanical shears may be uniformly applied. It is thus impossible to form a stable emulsion from the high-viscosity organopolysiloxane. Several methods of producing high-viscosity organopolysiloxane emulsions are known from Patent Documents 1 to 3, but not generally acceptable because they need a special emulsifying technique or device.

CITATION LIST

Patent Document 1: JP-A H05-032788
Patent Document 2: JP-A H07-070327
Patent Document 3: JP-A S63-125530 (U.S. Pat. No. 4,814,376)

DISCLOSURE OF INVENTION

An object of the invention is to provide an emulsion composition of a high-viscosity organopolysiloxane which is emulsified and kept stable without a need for a special technique or device.

The inventor has found that an organosilicone emulsion composition having improved stability is obtained by combining a high-viscosity organopolysiloxane with a polyether-containing organosiloxysilicate.

Accordingly, the invention provides an organosilicone emulsion composition comprising (A) 100 parts by weight of an organopolysiloxane having a viscosity of at least 500 Pa·s at 25° C.,
(B) 1 to 50 parts by weight of a polyether-containing organosiloxysilicate,
(C) 1 to 50 parts by weight of a nonionic surfactant, and
(D) 10 to 1,000 parts by weight of water.

In a preferred embodiment, component (A) is an organopolysiloxane having the general formula (I):

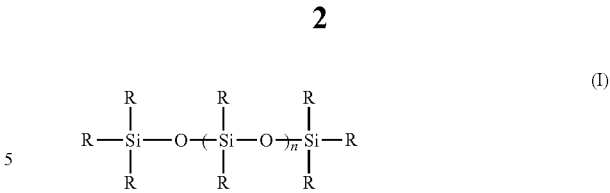

(I)

wherein R is each independently a substituted or unsubstituted monovalent hydrocarbon group of 1 to 20 carbon atoms, an alkoxy group of 1 to 6 carbon atoms, or a hydroxyl group, and n is an integer of 500 to 10,000.

In a preferred embodiment, component (B) is a polyether-containing organosiloxysilicate primarily comprising [$SiO_2$] units and [$R'_3SiO_{1/2}$] units wherein R' is each independently a substituted or unsubstituted monovalent hydrocarbon group of 1 to 12 carbon atoms, an alkoxy group of 1 to 6 carbon atoms, or a polyether-containing group having the general formula (II), at least one R' is a polyether-containing group of formula (II).

$$-X-(OC_2H_4)_a(OC_3H_6)_b(OC_4H_8)_c-O-Y \quad (II)$$

Herein X is a single bond or an alkylene group of 1 to 10 carbon atoms, Y is hydrogen or a substituted or unsubstituted monovalent hydrocarbon group of 1 to 20 carbon atoms, a is an integer of 1 to 50, b is an integer of 0 to 30, c is an integer of 0 to 30, a molar ratio of [$R'_3SiO_{1/2}$]/[$SiO_2$] being in a range of 0.3/1 to 3.0/1.

In a preferred embodiment, the polyether-containing organosiloxysilicate as component (B) is the condensation product of trimethylsiloxysilicate with a hydroxyl-containing polyalkylene glycol. In a more preferred embodiment, the hydroxyl-containing polyalkylene glycol has the general formula (III):

$$H-(OC_2H_4)_a(OC_3H_6)_b(OC_4H_8)_c-O-Y \quad (III)$$

wherein Y, a, b, and c are as defined above. In a further preferred embodiment, the polyether-containing organosiloxysilicate as component (B) is the condensation product of trimethylsiloxysilicate with a polyethylene glycol monoalkyl ether.

In a preferred embodiment, the polyether-containing organosiloxysilicate as component (B) is the addition reaction product of a hydrosilyl-containing methylsiloxysilicate with an unsaturated group-containing polyalkylene glycol. In a more preferred embodiment, the unsaturated group-containing polyalkylene glycol has the general formula (IV):

$$CH_2=CH-Z-(OC_2H_4)_a(OC_3H_6)_b(OC_4H_8)_c-O-Y \quad (IV)$$

wherein Y, a, b, and c are as defined above, Z is a single bond or a substituted or unsubstituted monovalent hydrocarbon group of 1 to 10 carbon atoms.

Advantageous Effects of Invention

An emulsion composition of a high-viscosity organopolysiloxane according to the invention has improved stability.

DISCLOSURE OF INVENTION

Briefly stated, the invention provides an organosilicone emulsion composition comprising (A) an organopolysiloxane having a viscosity of at least 500 Pa·s at 25° C., (B) a polyether-containing organosiloxysilicate, (C) a nonionic surfactant, and (D) water.

Component (A) is an organopolysiloxane having a viscosity of at least 500 Pa·s at 25° C., preferably represented by the general formula (I):

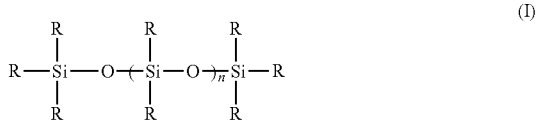

(I)

wherein R is each independently a substituted or unsubstituted monovalent hydrocarbon group of 1 to 20 carbon atoms, an alkoxy group of 1 to 6 carbon atoms, or a hydroxyl group, and n is an integer of 500 to 10,000.

R is a substituted or unsubstituted monovalent hydrocarbon group of 1 to 20 carbon atoms, preferably 1 to 6 carbon atoms, an alkoxy group of 1 to 6 carbon atoms, preferably 1 to 4 carbon atoms, or a hydroxyl group. Examples of suitable groups include alkyl groups such as methyl, ethyl, propyl, butyl, pentyl, hexyl, heptyl, octyl, nonyl, decyl, dodecyl, tetradecyl, hexadecyl, octadecyl, cyclopentyl, cyclohexyl, and cycloheptyl; aryl groups such as phenyl, benzyl, tolyl, xylyl, and naphthyl; alkenyl groups such as vinyl, allyl, butenyl, and pentenyl; aralkyl groups such as benzyl, phenylethyl and phenylpropyl; and substituted forms of the foregoing in which some or all hydrogen atoms are substituted by halogen atoms (e.g., fluoro, bromo or chloro), cyano, amino, epoxy, or mercapto groups, for example, fluoro-substituted alkyl groups such as —$CF_3$, —$CH_2CF_3$, —$C_2H_4CF_3$—, —$C_3H_6CF_3$, —$C_4H_8CF_3$, —$C_2F_5$, —$C_3F_7$, —$C_4F_9$, —$C_5F_{11}$, —$C_6F_{13}$, —$C_7F_{15}$, —$C_8F_{17}$, and —$C_9F_{19}$, amino-substituted alkyl groups such as —$C_3H_6NH_2$ and —$C_3H_6NHC_2H_4NH_2$, epoxy-substituted alkyl groups such as —$C_3H_6OCH_2HCH(O)CH_2$, and mercapto-substituted alkyl groups such as —$C_3H_6SH$. Also included are alkoxy groups such as methoxy, ethoxy, propoxy and butoxy, and hydroxyl groups. Preferably methyl accounts for at least 90 mol % of R. When R is a hydroxyl or alkoxy group, they are preferably attached at both ends of the molecular chain.

The subscript n is an integer of 500 to 10,000 and must have such a value that the organopolysiloxane has a viscosity of at least 500 Pa·s at 25° C.

The organopolysiloxane as component (A) should have a viscosity of at least 500 Pa·s at 25° C., preferably at least 1,000 Pa·s at 25° C. If the viscosity at 25° C. is less than 500 Pa·s, on use of the organopolysiloxane as a surface coating agent or parting agent, its performance is unsatisfactory. As the upper limit of the viscosity of the organopolysiloxane, the viscosity at 25° C. of a 30 wt % toluene solution is preferably up to 200 Pa·s, more preferably up to 100 Pa·s. As used herein, the viscosity is measured by a rotational viscometer.

Component (B) is a polyether-containing organosiloxysilicate which serves as an additive for improving the stability of an emulsion. Preferably the organosiloxysilicate is composed primarily of [$SiO_2$] units and [$R'_3SiO_{1/2}$] units. Herein R' is each independently a substituted or unsubstituted monovalent hydrocarbon group of 1 to 12 carbon atoms, preferably 1 to 10 carbon atoms, more preferably 1 to 6 carbon atoms, an alkoxy group of 1 to 6 carbon atoms, preferably 1 to 4 carbon atoms, or a polyether-containing group having the general formula (II). At least one R' is a polyether-containing group of formula (II).

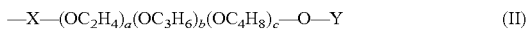   (II)

Herein X is a single bond or an alkylene group of 1 to 10 carbon atoms, preferably 1 to 6 carbon atoms, Y is hydrogen or a substituted or unsubstituted monovalent hydrocarbon group of 1 to 20 carbon atoms, preferably 1 to 18 carbon atoms, a is an integer of 1 to 50, b is an integer of 0 to 30, and c is an integer of 0 to 30.

In formula (II), X is a single bond or an alkylene group, examples of which include methylene, ethylene, propylene (specifically trimethylene or methylethylene), butylene (specifically tetramethylene or methylpropylene), and hexamethylene. Of these, a single bond, propylene and butylene are preferred.

Y is hydrogen or a substituted or unsubstituted monovalent hydrocarbon group, examples of which include alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, cyclopentyl, cyclohexyl, and cycloheptyl; aryl groups such as phenyl; alkenyl groups such as vinyl, allyl, butenyl, and pentenyl; aralkyl groups such as benzyl, phenylethyl and phenylpropyl; substituted forms of the foregoing in which some hydrogen atoms are substituted by oxygen, such as acetyl, and substituted forms of the foregoing in which some or all hydrogen atoms are substituted by halogen (e.g., fluoro, bromo or chloro) or cyano, such as chloromethyl, chloropropyl, bromoethyl, trifluoropropyl, and cyanoethyl. Of these, hydrogen, methyl, butyl, dodecyl, tridecyl, tetradecyl, pentadecyl, hexadecyl, heptadecyl, octadecyl, and acetyl are preferred.

The subscript a is an integer of 1 to 50, preferably 3 to 30, b is an integer of 0 to 30, preferably 0 to 20, and c is an integer of 0 to 30, preferably 0 to 20.

Illustrative examples of the group R' include alkyl groups such as methyl, ethyl, propyl, butyl, pentyl, hexyl, heptyl, octyl, nonyl, decyl, dodecyl, cyclopentyl, cyclohexyl, and cycloheptyl; aryl groups such as phenyl; alkenyl groups such as vinyl, allyl, butenyl, and pentenyl; aralkyl groups such as benzyl, phenylethyl and phenylpropyl; substituted forms of monovalent hydrocarbon groups in which some or all hydrogen atoms are substituted by halogen atoms (e.g., fluoro, bromo or chloro) or cyano, such as chloromethyl, chloropropyl, bromoethyl, trifluoropropyl, and cyanoethyl; alkoxy groups such as methoxy, ethoxy, propoxy, and butoxy; and polyether-containing groups such as —$(OC_2H_4)_a$—O—$C_{10}H_{21}$, —$(OC_2H_4)_a$—O—$C_{11}H_{23}$, —$(OC_2H_4)_a$—O—$C_{12}H_{25}$, —$(OC_2H_4)_a$—O—$C_{14}H_{29}$, —$(OC_2H_4)_a$—O—$C_{16}H_{33}$, —$(OC_2H_4)_a$—O—$C_{18}H_{37}$, —$(OC_2H_4)_a(OC_3H_6)_b$—O—$C_{10}H_{21}$, —$(OC_2H_4)_a(OC_3H_6)_b$—O—$C_{11}H_{23}$, —$(OC_2H_4)_a(OC_3H_6)_b$—O—$C_{12}H_{25}$, —$(OC_2H_4)_a(OC_3H_6)_b$—O—$C_{14}H_{29}$, —$(OC_2H_4)_a(OC_3H_6)_b$—O—$C_{16}H_{33}$, —$(OC_2H_4)_a(OC_3H_6)_b$—O—$C_{18}H_{37}$, —$(OC_2H_4)_a$—$OC_6H_4$—$C_8H_{17}$, —$(OC_2H_4)_a$—$OC_6H_4$—$C_9H_{19}$, —$C_2H_4$—$(OC_2H_4)_a$—O—H, —$C_2H_4$—$(OC_2H_4)_a$—O—$CH_3$, —$C_2H_4$—$(OC_2H_4)_a$—O—$C_4H_9$, —$C_2H_4$—$(OC_2H_4)_a$—O—$COCH_3$, —$C_3H_6$—$(OC_2H_4)_a$—O—H, —$C_3H_6$—$(OC_2H_4)_a$—O—$CH_3$, —$C_3H_6$—$(OC_2H_4)_a$—O—$C_4H_9$, —$C_3H_6$—$(OC_2H_4)_a$—O—$COCH_2$, —$C_4H_8$—$(OC_2H_4)_a$—O—H, —$C_4H_8$—$(OC_2H_4)_a$—O—$CH_3$, —$C_4H_8$—$(OC_2H_4)_a$—O—$C_4H_9$, and —$C_4H_8$—$(OC_2H_4)_a$—O—$COCH_3$ wherein a and b are as defined above. Of the foregoing groups other than the polyether-containing groups, methyl is preferred. Of the polyether-containing groups, —$(OC_2H_4)_a$—O—$C_{10}H_{21}$, —$(OC_2H_4)_a$—O—$C_{11}H_{23}$, —$(OC_2H_4)_a$—O—$C_{12}H_{25}$, —$(OC_2H_4)_a$—O—$C_{14}H_{29}$, —$(OC_2H_4)_a$—O—$C_{16}H_{33}$, and —$(OC_2H_4)_a$—O—$C_{18}H_{37}$ are preferred.

The [$SiO_2$] units and [$R'_3SiO_{1/2}$] units are combined in a molar ratio of [$R'_3SiO_{1/2}$]/[$SiO_2$] falling in a range of 0.3/1 to 3.0/1, preferably 0.4/1 to 2.0/1. If the molar ratio is too low or too high, emulsion stability may decline.

In the polyether-containing organosiloxysilicate, [$R'_2SiO$] units and [$R'SiO_{3/2}$] units wherein R' is as defined above may be contained in a total amount of 0 to 20% by weight, preferably 0 to 10% by weight based on the total weight of the polyether-containing organosiloxysilicate. Component (B) may be a single organosiloxysilicate or a mixture of two or more organosiloxysilicates.

The polyether-containing organosiloxysilicate may be obtained from condensation reaction of an organosiloxysilicate having residual silanol with a hydroxyl-containing polyalkylene glycol, or addition reaction of a hydrosilyl-containing organosiloxysilicate with an unsaturated group-containing polyalkylene glycol. It is preferably obtained from condensation reaction of an organosiloxysilicate having residual silanol with a hydroxyl-containing polyalkylene glycol, or addition reaction of a hydrosilyl-containing organosiloxysilicate with an unsaturated group-containing polyalkylene glycol; more preferably from condensation reaction of trimethylsiloxysilicate with a hydroxyl-containing polyalkylene glycol, or addition reaction of a hydrosilyl-containing methylsiloxysilicate with an unsaturated group-containing polyalkylene glycol; most preferably from condensation reaction of trimethylsiloxysilicate with a polyethylene glycol monoalkyl ether.

Examples of the organosiloxysilicate used herein include trimethylsiloxysilicate, triethylsiloxysilicate, and trimethylsiloxydimethyldisiloxysilicate, with trimethylsiloxysilicate and trimethylsiloxydimethyldisiloxysilicate being preferred.

Examples of the hydroxyl-containing polyalkylene glycol include those having the general formula (III):

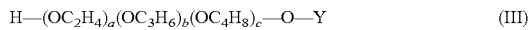

$$\text{H—(OC}_2\text{H}_4)_a(\text{OC}_3\text{H}_6)_b(\text{OC}_4\text{H}_8)_c\text{—O—Y} \tag{III}$$

wherein Y, a, b and c are as defined above. Of these, H—$(OC_2H_4)_a$—O—$C_{10}H_{23}$, H—$(OC_2H_4)_a$—O—$C_{12}H_{25}$, and H—$(OC_2H_4)_a$—O—$C_{14}H_{29}$ are preferred.

For the condensation reaction, the organosiloxysilicate and the hydroxyl-containing polyalkylene glycol are preferably combined in such amounts that 0.5 to 3 moles, more preferably 0.6 to 2 moles of hydroxyl groups on the polyalkylene glycol may be available per mole of silanol on the organosilicate. If the molar ratio of hydroxyl to silanol is less than 0.5, little improvement in emulsion stability is obtained. If the molar ratio exceeds 3, the conversion rate remains unchanged. For this reason, a molar ratio of hydroxyl/silanol is preferably from 0.5 to 3.

The condensation reaction takes place at elevated temperature in the presence of a catalyst. The catalyst is typically selected from tin, zinc, zirconium, bismuth and iron compounds. Suitable catalysts include tin octylate, dioctyltin diacetate, dioctyltin dilaurate, dioctyltin diversatate, dibutyltin dilaurate, zinc octylate, zirconium octylate, bismuth octylate, iron octylate, and iron acetylacetone. The catalyst is preferably used in an amount of 0.05 to 5%, more preferably 0.1 to 3% by weight based on the total weight of organosiloxysilicate and hydroxyl-containing polyalkylene glycol.

With respect to reaction conditions, condensation reaction is preferably conducted under atmospheric pressure to a reduced pressure of about 100 Pa, at 30 to 150° C. for 1 to 300 hours, more preferably at 80 to 120° C. for 5 to 50 hours.

In the case of addition reaction, examples of the hydrosilyl or Si—H-containing organosiloxysilicate include dimethylsiloxysilicate, dimethylsiloxytrimethylsiloxysilicate, dimethylsiloxydimethyldisiloxysilicate, and dimethylsiloxytrimethylsiloxydimethyldisiloxysilicate, with dimethylsiloxysilicate being preferred.

Examples of the unsaturated group-containing polyalkylene glycol include those having the general formula (IV):

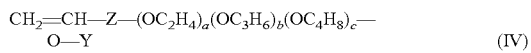

$$\text{CH}_2\text{=CH—Z—(OC}_2\text{H}_4)_a(\text{OC}_3\text{H}_6)_b(\text{OC}_4\text{H}_8)_c\text{—O—Y} \tag{IV}$$

wherein Y, a, b, and c are as defined above, Z is a single bond or a substituted or unsubstituted monovalent hydrocarbon group of 1 to 10 carbon atoms.

In formula (IV), Z is a single bond or a substituted or unsubstituted monovalent hydrocarbon group, examples of which include alkyl groups such as methyl, ethyl, propyl, butyl, pentyl, hexyl, heptyl, octyl, nonyl, decyl, cyclopentyl, cyclohexyl, and cycloheptyl; aryl groups such as phenyl; alkenyl groups such as vinyl, allyl, butenyl, and pentenyl; aralkyl groups such as benzyl, phenylethyl and phenylpropyl; substituted forms of monovalent hydrocarbon groups in which some or all hydrogen atoms are substituted by halogen atoms (e.g., fluoro, bromo or chloro) or cyano, such as chloromethyl, chloropropyl, bromoethyl, trifluoropropyl, and cyanoethyl. Methyl is most preferred.

Of the unsaturated group-containing polyalkylene glycols, polyethylene glycol monoallyl ether and polyethylene glycol alkyl allyl ethers are preferred.

For the addition reaction, the hydrosilyl-containing organosiloxysilicate and the unsaturated group-containing polyalkylene glycol are combined in such amounts that a molar ratio of unsaturated groups to Si—H groups may be 1.0/1 to 2.0/1.

A catalyst is generally used in the addition reaction. Platinum group metal based catalysts, typically chloroplatinic acid are suitable. The addition reaction catalyst is preferably used in an amount of 0.0001 to 0.01%, more preferably 0.0003 to 0.003% by weight based on the total weight of hydrosilyl-containing organosiloxysilicate and unsaturated group-containing polyalkylene glycol.

With respect to reaction conditions, addition reaction is preferably conducted under atmospheric pressure at 30 to 130° C. for 1 to 24 hours, more preferably at 60 to 120° C. for 1 to 8 hours.

Component (B), polyether group-containing organosiloxysilicate should preferably have a polyether content of 20 to 80% by weight. Outside the range, the effect of improving emulsion stability is reduced. The polyether content of component (B) is more preferably 30 to 70% by weight.

Component (B) should preferably have a viscosity at 25° C. of 0.1 to 1,000 Pa·s, more preferably 0.2 to 500 Pa·s.

An appropriate amount of component (B) added is 1 to 50 parts by weight per 100 parts by weight of component (A). Outside the range, the effect of improving emulsion stability is reduced. The amount of component (B) added is preferably 3 to 40 parts by weight, more preferably 5 to 30 parts by weight.

Component (C) is a nonionic surfactant which is an emulsifier effective for emulsifying and dispersing the organopolysiloxane and the polyether group-containing organosiloxysilicate in water. No particular limits are imposed on the surfactant as long as it is nonionic. Suitable nonionic surfactants include polyoxyethylene alkyl ethers, polyoxyethylene propylene alkyl ethers, polyoxyethylene alkyl phenyl ethers, and polyoxyethylene fatty acid esters. Inter alia, polyoxyethylene alkyl ethers, polyoxyethylene propylene alkyl ethers, and polyoxyethylene alkyl phenyl ethers are preferred for stability. Suitable examples include polyoxyethylene octyl ether, polyoxyethylene nonyl ether, polyoxyethylene decyl ether, polyoxyethylene propylene decyl ether, polyoxyethylene lauryl ether, polyoxyethylene propylene lauryl ether, polyoxyethylene tridecyl ether, polyoxyethylene propylene tridecyl ether, polyoxyethylene myristyl ether, polyoxyethylene cetyl ether, polyoxyethylene stearyl ether, polyoxyethylene octyl phenyl ether, polyoxyethylene nonyl phenyl ether, and polyoxyethylene styrenated phenyl ether. These emulsifiers may be used alone or in admixture.

An appropriate amount of component (C) added is 1 to 50 parts by weight per 100 parts by weight of component (A). Emulsification is difficult with less than 1 pbw of the surfactant whereas more than 50 pbw of the surfactant may detract from the silicone characteristics of the composition. The amount of component (C) added is preferably 2 to 40 parts by weight, more preferably 3 to 30 parts by weight.

In the organosilicone emulsion composition, water is formulated as component (D). An appropriate amount of component (D) added is 10 to 1,000 parts by weight, preferably 30 to 300 parts by weight per 100 parts by weight of component (A).

The organosilicone emulsion composition is prepared by agitating the organopolysiloxane as component (A), the polyether-containing organosiloxysilicate as component (B), and the nonionic surfactant as component (C) on a mixer capable of mixing and agitating highly viscous materials, such as a planetary mixer or Shinagawa mixer, until uniform, slowly adding water as component (D), and uniformly agitating the contents until a uniform emulsion is obtained.

The organosilicone emulsion composition thus obtained preferably has a viscosity of 25 to 1,000 Pa·s, more preferably 30 to 500 Pa·s. A composition with a viscosity of less than 25 Pa·s may be low in emulsion stability whereas a composition with a viscosity of more than 1,000 Pa·s may be inefficient to work.

Also preferably the organosilicone emulsion composition has a particle size of 0.3 to 2.0 μm, more preferably 0.4 to 1.8 μm. If the particle size is less than 0.3 μm, the emulsion may have too high a viscosity. If the particle size exceeds 2.0 μm, emulsion stability may decline. It is noted that the particle size is measured by a particle size distribution analyzer LA-920 by Horiba, Ltd.

The organosilicone emulsion composition is applicable to a variety of substrates as surface coating agent, parting agent, lubricant, lustering agent or the like.

EXAMPLE

Preparation Examples, Examples and Comparative Examples are given below for illustrating the invention although the invention is not limited thereto. In Examples, the viscosity is measured at 25° C. by a BM type rotational viscometer, and the particle size is measured by a particle size distribution analyzer LA-920 by Horiba, Ltd. Sannonic SS120 is a surfactant (a mixture of HO—$(C_2H_4O)_{12}$—$C_{12}H_{25}$ and HO—$(C_2H_4O)_{12}$—$C_{14}H_{29}$) commercially available from Sanyo Chemical Industries, Ltd.

Preparation Example 1

A vacuum stripping system equipped with an agitator and thermometer was charged with 500 g of a 70 wt % toluene solution of trimethylsiloxysilicate having the compositional formula: $[(CH_3)_3SiO_{1/2}]_{0.43}[SiO_{4/2}]_{0.57}$ and a OH group content of 1.7 wt %, 290 g of Sannonic SS120, and 13 g of Neostann U-28 (tin octylate by Nitto Kasei Co., Ltd.). Toluene was stripped off at 90° C. and 1 kPa, after which condensation reaction was conducted for 20 hours, yielding a colorless clear product, polyether-containing organosiloxysilicate #1. The product had a viscosity of 15 Pa·s, a volatile content of up to 0.1 wt % upon heating at 105° C. for 3 hours, and a polyether content of about 34%.

Example 1

A 2-L planetary mixer was charged with 500 g of gum-like dimethylpolysiloxane having a viscosity of at least 1,000 Pa·s and a viscosity in 30 wt % toluene solution of 8,000 mPa·s as component (A), 70 g of polyether-containing organosiloxysilicate #1 in Preparation Example 1 as component (B), and 120 g of Sannonic SS120 as component (C), which were mixed until uniform. The mixture was then emulsified while slowly adding 310 g of water as component (D). There was obtained a uniform white pasty emulsion having a viscosity of 90 Pa·s and a particle size of 1.0 μm. The emulsion remained uniform after storage at room temperature for 3 months.

Example 2

The procedure of Example 1 was repeated aside from using 500 g of gum-like dimethylpolysiloxane (containing silanol at both ends) having a viscosity of at least 1,000 Pa·s and a viscosity in 30 wt % toluene solution of 7,000 mPa·s as component (A) instead of the gum-like dimethylpolysiloxane having a viscosity of at least 1,000 Pa·s and a viscosity in 30 wt % toluene solution of 8,000 mPa·s. There was obtained a uniform white pasty emulsion having a viscosity of 100 Pa·s and a particle size of 0.9 μm. The emulsion remained uniform after storage at room temperature for 3 months.

Example 3

A 2-L planetary mixer was charged with 300 g of gum-like dimethylpolysiloxane having a viscosity of at least 1,000 Pa·s and a viscosity in 30 wt % toluene solution of 8,000 mPa·s as component (A), 90 g of polyether-containing organosiloxysilicate #1 in Preparation Example 1 as component (B), and 90 g of Sannonic SS120 as component (C), which were mixed until uniform. The mixture was then emulsified while slowly adding 520 g of water as component (D). There was obtained a uniform white pasty emulsion having a viscosity of 30 Pa·s and a particle size of 0.6 μm. The emulsion remained uniform after storage at room temperature for 3 months.

Comparative Example 1

A 2-L planetary mixer was charged with 500 g of gum-like dimethylpolysiloxane having a viscosity of at least 1,000 Pa·s and a viscosity in 30 wt % toluene solution of 8,000 mPa·s as component (A), and 120 g of Sannonic SS120 as component (C), which were mixed until uniform. The mixture was then emulsified while slowly adding 380 g of water as component (D). There was obtained a uniform white emulsion having a viscosity of 10 Pa·s and a particle size of 3.6 μm. The emulsion separated after a half day.

Comparative Example 2

A 2-L planetary mixer was charged with 500 g of gum-like dimethylpolysiloxane having a viscosity of at least 1,000 Pa·s and a viscosity in 30 wt % toluene solution of 8,000 mPa·s as component (A), and 190 g of Sannonic SS120 as component (C), which were mixed until uniform. The mixture was then emulsified while slowly adding 310 g of water as component (D). There was obtained a uniform white emulsion having a viscosity of 20 Pa·s and a particle size of 2.7 μm. The emulsion separated after one day.

Comparative Preparation Example 1

A vacuum stripping system equipped with an agitator and thermometer was charged with 500 g of a 70 wt % toluene solution of trimethylsiloxysilicate having the compositional formula: $[(CH_3)_3SiO_{1/2}]_{0.43}[SiO_{4/2}]_{0.57}$ and a OH group content of 1.7 wt %, and 290 g of Sannonic SS120. Toluene was stripped off at 90° C. and 1 kPa, after which the reactor was heated for 20 hours, yielding a white solid #2. It had a volatile content of 0.8 wt % upon heating at 105° C. for 3 hours.

Comparative Example 3

The procedure of Example 1 was repeated aside from using white solid #2 in Comparative Preparation Example 2 as component (B) instead of the polyether-containing organosiloxysilicate #1. This example failed to obtain a uniform emulsion.

Japanese Patent Application No. 2014-005690 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organosilicone emulsion composition comprising
(A) 100 parts by weight of an organopolysiloxane having a viscosity of at least 500 Pa·s at 25° C.,
(B) 1 to 50 parts by weight of a polyether-containing organosiloxysilicate in the form of a condensation product of trimethylsiloxysilicate with a hydroxyl-containing polyalkylene glycol,
(C) 1 to 50 parts by weight of a nonionic surfactant, and
(D) 10 to 1,000 parts by weight of water.

2. The emulsion composition of claim 1 wherein component (A) is an organopolysiloxane having the general formula (I):

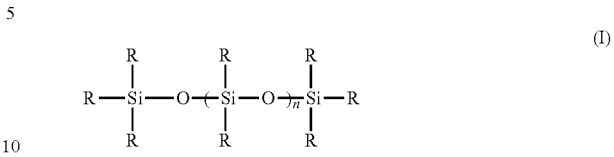

(I)

wherein R is each independently a substituted or unsubstituted monovalent hydrocarbon group of 1 to 20 carbon atoms, an alkoxy group of 1 to 6 carbon atoms, or a hydroxyl group, and n is an integer of 500 to 10,000.

3. The emulsion composition of claim 1, wherein the hydroxyl-containing polyalkylene glycol has the general formula (III):

$$\text{H}-(\text{OC}_2\text{H}_4)_a(\text{OC}_3\text{H}_5)_b(\text{OC}_4\text{H}_8)_c-\text{O}-\text{Y} \qquad (\text{III})$$

wherein Y is hydrogen or a substituted or unsubstituted monovalent hydrocarbon group of 1 to 20 carbon atoms, a is an integer of 1 to 50, b is an integer of 0 to 30, and c is an integer of 0 to 30.

4. The emulsion composition of claim 1, wherein the polyether-containing organosiloxysilicate as component (B) is the condensation product of trimethylsiloxysilicate with a polyethylene glycol monoalkyl ether.

* * * * *